(12) United States Patent
Waltermann et al.

(10) Patent No.: US 10,942,998 B2
(45) Date of Patent: Mar. 9, 2021

(54) USING GAS CHROMATOGRAPHY FOR AUTHENTICATION, ADVERTISEMENTS, AND THERAPIES

(71) Applicant: Lenovo (Singapore) Pte. Ltd., Singapore (SG)

(72) Inventors: Rod D. Waltermann, Rougemont, NC (US); Timothy Winthrop Kingsbury, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 55 days.

(21) Appl. No.: 16/400,891

(22) Filed: May 1, 2019

(65) Prior Publication Data

US 2019/0258792 A1    Aug. 22, 2019

Related U.S. Application Data

(62) Division of application No. 15/244,319, filed on Aug. 23, 2016, now abandoned.

(51) Int. Cl.
| | |
|---|---|
| G06Q 30/00 | (2012.01) |
| G06F 21/32 | (2013.01) |
| G06F 21/62 | (2013.01) |
| G06Q 30/02 | (2012.01) |
| G01N 30/86 | (2006.01) |

(52) U.S. Cl.
CPC .......... *G06F 21/32* (2013.01); *G06F 21/6218* (2013.01); *G06Q 30/0269* (2013.01); *G01N 30/8679* (2013.01)

(58) Field of Classification Search
None
See application file for complete search history.

(56) References Cited

U.S. PATENT DOCUMENTS

| 6,171,811 | B1* | 1/2001 | Becerro De Bengoa Vallejo ....... C12Q 1/16 435/34 |
| 6,631,333 | B1* | 10/2003 | Lewis ................ G01N 33/0031 702/23 |
| 9,389,207 | B2 | 7/2016 | Bae et al. |
| 2008/0077331 | A1* | 3/2008 | Lewis ................ G01N 33/0031 702/30 |
| 2008/0082393 | A1* | 4/2008 | Ozzie ................ G06Q 30/0282 705/7.11 |
| 2008/0082467 | A1* | 4/2008 | Meijer ................ G06F 16/27 706/12 |

(Continued)

OTHER PUBLICATIONS

STIC, EIC 3600 Search Report for application 16400891, dated Aug. 31, 2020 (Year: 2020).*

(Continued)

*Primary Examiner* — Matthew T Sittner
(74) *Attorney, Agent, or Firm* — John M. Rogitz; John L. Rogitz

(57) ABSTRACT

In one aspect, a device includes a processor and storage accessible to the processor. The storage bears instructions executable by the processor to receive at least one output of a gas chromatograph (GC), compare the at least one output to at least one template, and determine whether to authenticate a user responsive to the comparison. The GC output also may be used to generate at least one advertisement targeted to the user, and may further be used to output at least one indication of at least one therapy for the user.

20 Claims, 5 Drawing Sheets

(56) References Cited

U.S. PATENT DOCUMENTS

| | | | |
|---|---|---|---|
| 2008/0148059 A1* | 6/2008 | Shapiro | G06F 21/32 713/186 |
| 2010/0039218 A1* | 2/2010 | Cohen | H04L 61/301 340/5.8 |
| 2011/0190579 A1* | 8/2011 | Ziarno | G06F 19/3418 600/109 |
| 2012/0029928 A1* | 2/2012 | Kountotsis | G06Q 30/00 705/1.1 |
| 2012/0119906 A1* | 5/2012 | Kountotsis | G01N 33/00 340/540 |
| 2012/0215284 A1* | 8/2012 | Berg | A61N 1/37235 607/59 |
| 2013/0159939 A1* | 6/2013 | Krishnamurthi | G06F 3/011 715/863 |
| 2013/0289332 A1* | 10/2013 | Purdie | A61N 5/1039 600/1 |
| 2014/0038152 A1* | 2/2014 | Micieli | G16H 40/63 434/267 |
| 2014/0068270 A1* | 3/2014 | Shenoy | H04L 63/0815 713/182 |
| 2014/0108241 A1* | 4/2014 | Tunnell | G06Q 20/363 705/41 |
| 2014/0258547 A1* | 9/2014 | Scavo | H04L 67/141 709/227 |
| 2014/0316222 A1* | 10/2014 | Rabinovitz | A61B 5/0084 600/302 |
| 2014/0377815 A1* | 12/2014 | Hennessy | C02F 3/342 435/114 |
| 2015/0039421 A1* | 2/2015 | Ford | G06Q 30/0252 705/14.49 |
| 2015/0127460 A1* | 5/2015 | Daub | G06Q 30/0269 705/14.58 |
| 2015/0376681 A1* | 12/2015 | Gupta | C12Q 1/6844 506/9 |
| 2016/0063588 A1* | 3/2016 | Gadre | G06F 16/9537 705/26.61 |
| 2016/0166936 A1* | 6/2016 | Millegan | A63F 13/98 463/29 |
| 2016/0191511 A1* | 6/2016 | Tijerina | A61B 5/0402 726/7 |
| 2016/0215993 A1* | 7/2016 | Balkhair | G05B 15/02 |
| 2017/0053249 A1* | 2/2017 | Tunnell | G06Q 20/065 |
| 2017/0098051 A1* | 4/2017 | Balram | G16H 40/67 |
| 2017/0249451 A1* | 8/2017 | Andreeva | G06F 21/32 |
| 2017/0278084 A1* | 9/2017 | Kumra | G06Q 20/405 |
| 2018/0018704 A1* | 1/2018 | Tunnell | G06Q 30/0269 |
| 2018/0060551 A1* | 3/2018 | Waltermann | G06Q 30/0269 |
| 2019/0013093 A1* | 1/2019 | Slepian | G06Q 50/24 |
| 2019/0258792 A1* | 8/2019 | Waltermann | G06Q 30/0269 |

OTHER PUBLICATIONS

Christie Wilcox, "The Nose Knows: Telling Age Based on Scent", Scientific American, May 30, 2012. Retrieved from http://blogs.scientificamerican.com/science-sushi/the-nose-knows-telling-age-based-on-scent/.

Jan Havlicek, Pavlina Lenochova, "The Effect of Meat Consumption on Body Odor Attractiveness", Oxford Journals: Chemical Senses; Aug. 4, 2006, p. 747-752, vol. 31, Issue 8. Retrieved from http://chemse.oxfordjournals.org/content/31/8/747.long.

Yutao Qin, Yogesh B. Gianchandani, "A fully electronic microfabricated gas chromatograph with complementary capacitive detectors for indoor pollutants", Microsystems & Nanoengineering, Feb. 29, 2016. Retrieved from http://www.nature.com/articles/micronano201549.

* cited by examiner

_US 10,942,998 B2_

USING GAS CHROMATOGRAPHY FOR AUTHENTICATION, ADVERTISEMENTS, AND THERAPIES

FIELD

The present application relates generally to using gas chromatography for authentication of a person, generation of at least one advertisement for the person, and/or presentation of at least one indication of at least one therapy for the person.

BACKGROUND

As technology progresses, so do malicious hackers seeking to exploit technological vulnerabilities after getting past inadequate authentication safeguards. Furthermore, as understood herein, it is possible to measure a person's chemical signatures using gas chromatography.

SUMMARY

Accordingly, in one aspect a device includes a processor and storage accessible to the processor. The storage bears instructions executable by the processor to receive at least one output of a gas chromatograph (GC), and to compare the at least one output to at least one template. The instructions are executable to determine whether to authenticate a user responsive to the comparison.

In some embodiments, the at least one output may indicate "N" substances, where "N" is an integer greater than one, and the at least one template may indicate "M" substances, where "M" is an integer greater than one. In this embodiment the instructions may be executable to, responsive to the comparison indicating that "N" equals "M", determine to authenticate the user, whereas responsive to the comparison not indicating that "N" equals "M", the instructions may be executable to determine not to authenticate the user.

In other embodiments, responsive to the comparison indicating that "N" equals "M"±C, where C is an integer greater than zero, it may be determined to authenticate the user, and otherwise not authenticate the user.

In some embodiments, the instructions may be executable to, responsive to the comparison indicating that the substances indicated in the GC output are equal to the substances indicated in the template, determine to authenticate the user, and responsive to the comparison not indicating that the substances indicated in the GC output are equal to the substances indicated in the template, determine not to authenticate the user. If desired, the instructions may be executable to, responsive to the comparison indicating that at least "M"±C of the substances indicated in the GC output are equal (in identity) to the substances indicated in the template, determine to authenticate the user, and otherwise not authenticate the user.

In addition, or in lieu of the foregoing, in some embodiments the instructions may be executable to, responsive to the comparison indicating that all "N" amplitude peaks are equal, within a range, to the corresponding "M" amplitude peaks, determine to authenticate the user, and otherwise not to authenticate the user. Note that in some embodiments all amplitude peaks should match or, in other embodiments, the "N" peaks in the test image may have to match only "M"±D of the template peaks for "authenticated" to be returned.

One, two, or all three of the tests (number of peaks, type of substance, and amplitude) may be used. When multiple tests are used, a single match in one of them may be sufficient to return "authenticated", even if no match is obtained from the other test(s). Or, all tests should produce match; otherwise, "not authenticated" may be returned. Yet again, when three tests are used, "authenticated" may be returned if only two of three tests produce a match.

In another embodiment, a computer readable storage medium (CRSM) that is not a transitory signal comprises instructions executable by a processor to receive at least one output of a gas chromatograph representing a chemical signature of a person. The instructions are executable to, based at least in part on the at least one output, generate at least one advertisement targeted to the person.

In another embodiment, a method includes receiving at least one output of a gas chromatograph representing a chemical signature of a person and based at least in part on the at least one output, presenting at least one indication of at least one therapy for the person.

The details of present principles, both as to their structure and operation, can best be understood in reference to the accompanying drawings, in which like reference numerals refer to like parts, and in which:

DETAILED DESCRIPTION

Figure 1:
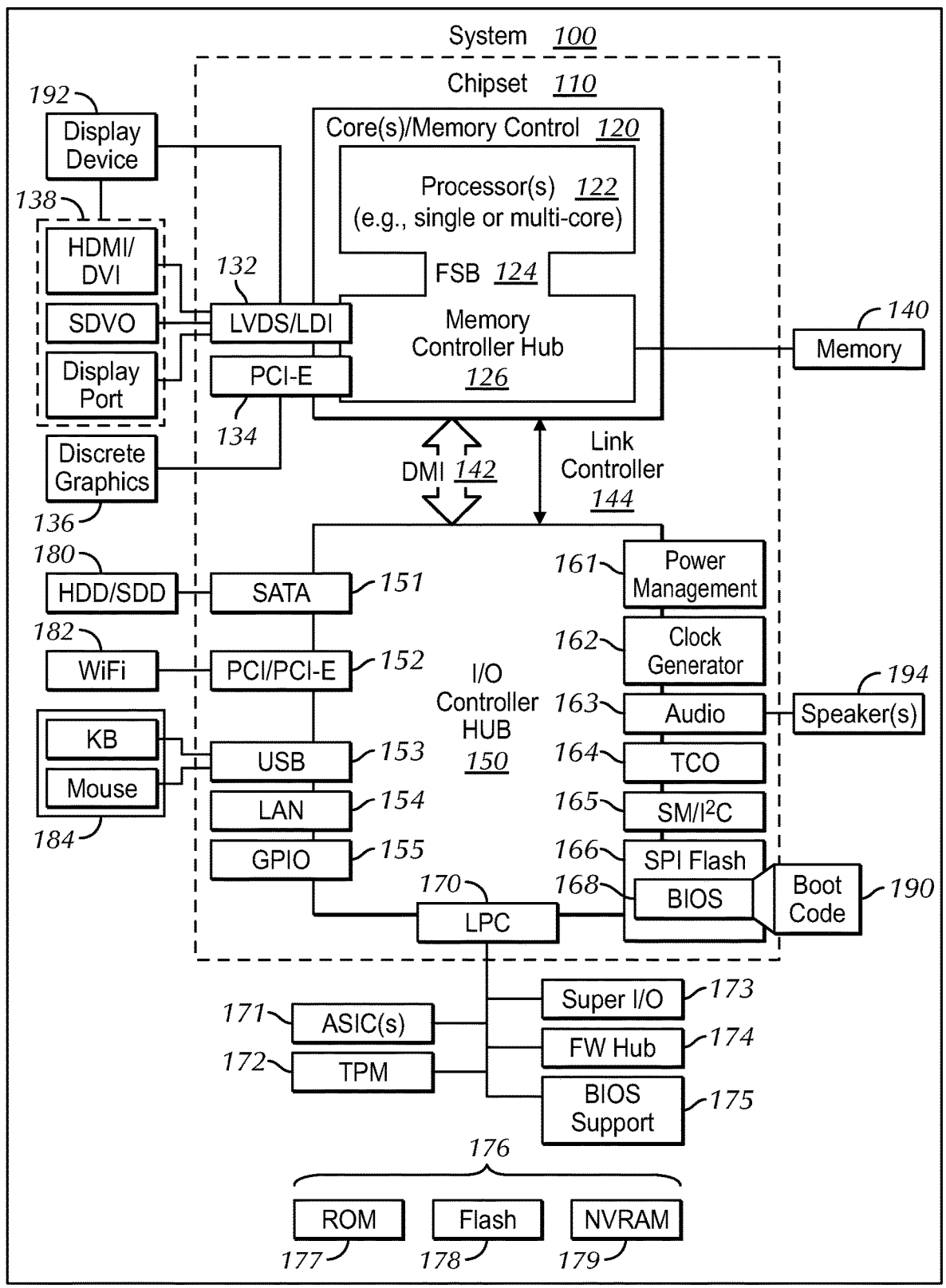
FIG. 1 is a block diagram of an example system in accordance with present principles.

As recognized herein, it is possible for animals to discriminate one person from another based-on scent. As also recognized herein, gas chromatography may be used to approximate scent-based discrimination, and this recognition in turn may be used in computer authentication and other uses.

Accordingly, the present disclosure relates to improving the security of individual computer systems by authenticating computer users at least in part using gas chromatography. Such authentication is non-invasive and may be continuously or periodically employed and may be less vulnerable to spoofing than authentication techniques such as face recognition.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one or more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB) and mice, microphones and various other devices (e.g., cameras, phones, storage, media players, etc.). Other examples of input devices 184 include gas chromatography instruments that output electrical signals based on an input of a person's chemical signature carried in the scent of the person.

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
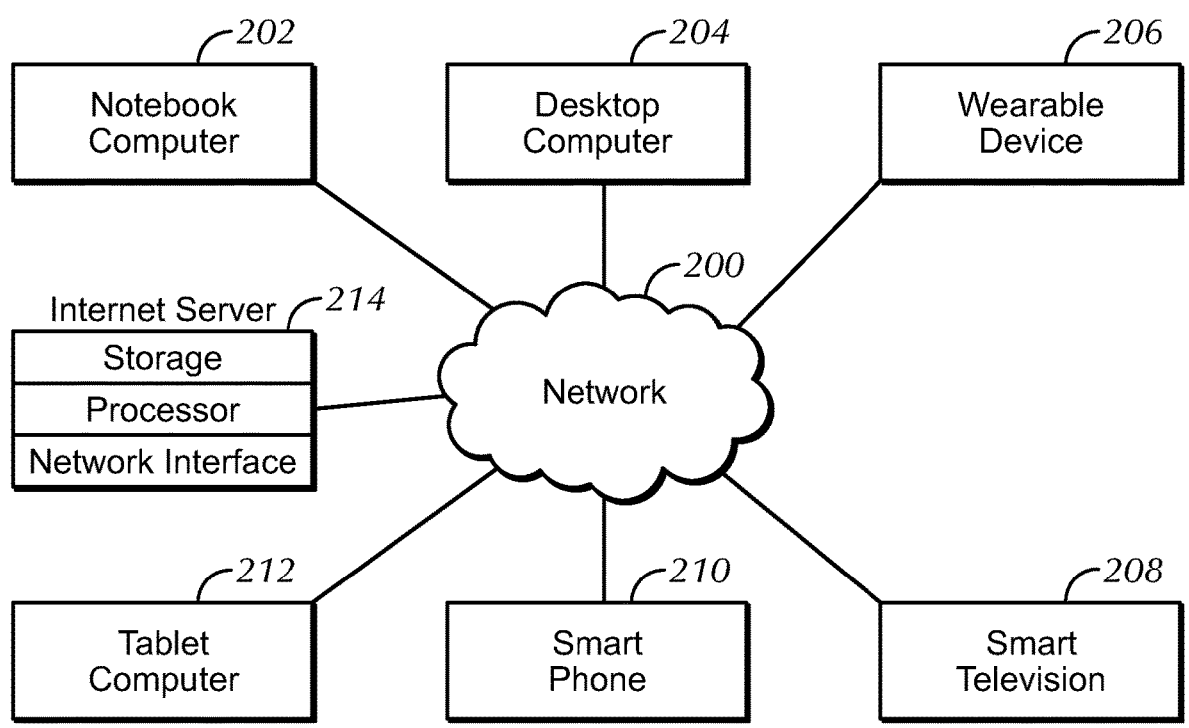
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
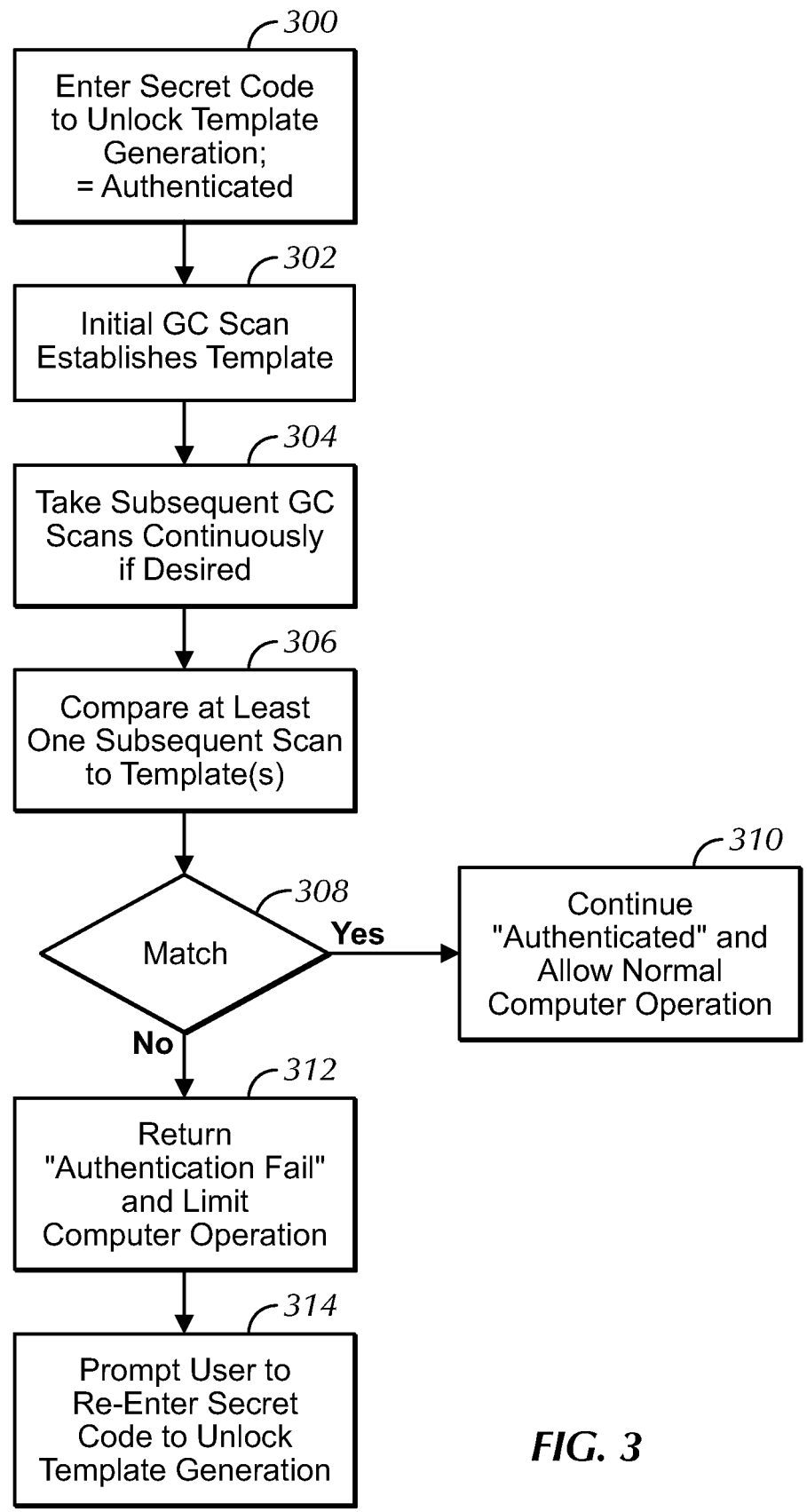
FIG. 3 is a flow chart of example logic.

Referring to FIG. 3, example logic is shown. Note that the gas chromatograph (GC) such as disclosed in U.S. Pat. No. 9,389,207 and in http://www.nature.com/articles/micronano201549, both incorporated herein by reference, may be used as an input device 184 (FIG. 1) for computer authentication as described herein.

Commencing at block 300, a secret may be required to be entered to unlock the template generation mode. Entry of the code may result in the current user being authenticated. Typically, the code may be at the administrator level or other secrecy-maintaining level so that only authorized users likely will be able to obtain the code to generate a template.

Moving to block 302, one or more images of the person's chemical signature as indicated by signals from the gas chromatograph (GC) 184 is obtained for subsequent use as described below. These images may be obtained using a GC that, as shown in FIG. 1, may be built into the computer or it may be obtained from a standalone GC sending image signals to the computer analyzing the signals. The GC typically is positioned close by the user and directed toward the user being imaged to obtain a chemical signature of the user. The user may be instructed to breathe into the GC, for example.

Subsequent to establishing the baseline templates, the user of the computer may thereafter be monitored, essentially continuously and/or periodically at predetermined intervals if desired, by the GC at block 304. For example, a test chemical signature may be obtained every second, to ensure an authenticated user is operating the computer. Or, at subsequent login a test chemical signature may be generated.

When a test chemical signature is obtained, the logic can move from block 304 to block 306 to compare at least one test chemical signature with the templates obtained at block 302. In one example, the test chemical signature(s) is compared to the template(s) corresponding to the user name at log in, and to no other templates in the library. In other embodiments the test chemical signature(s) may be compared to all of the templates in the library such that any previously authorized user will be authenticated.

At decision diamond 308 it is determined, e.g., using pattern matching, whether the test chemical signature(s) obtained at block 304 match a template obtained at block 302 and/or otherwise a template residing in the template library. For "match" to be returned, the test chemical signature should typically match the template within the tolerance demanded by the pattern matching recognition being employed, using one or more of the following criteria.

Figure 7:
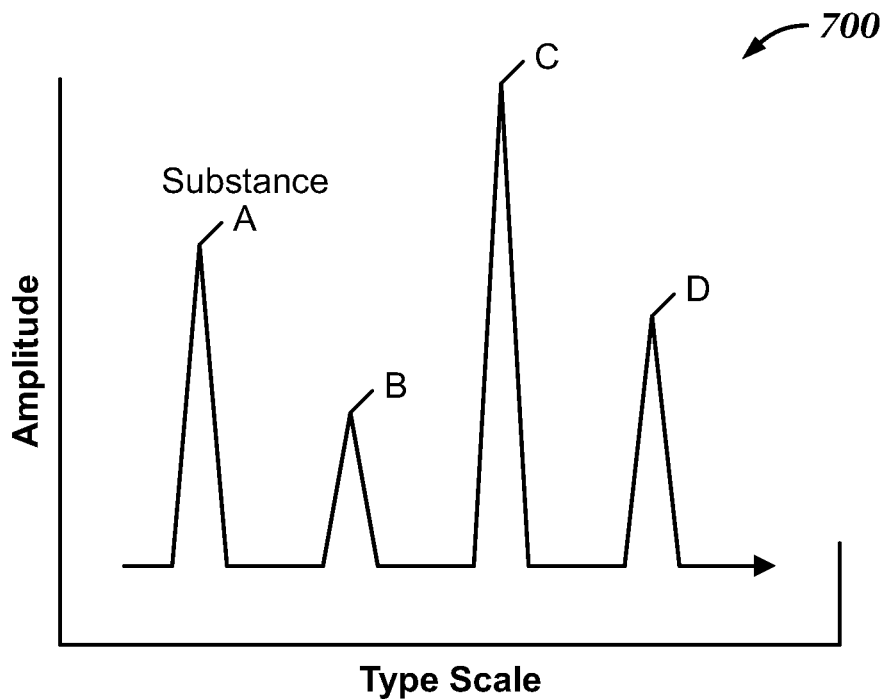
FIG. 7 is a graph of an example gas chromatography (GC) output.

Refer briefly to FIG. 7, which shows an example GC output 700 in graphical form for illustration. The output 700 may be a template chemical signature and, for a match, a subsequent test chemical signature.

As shown, the output indicates "N" peaks each representing a respective substance (e.g., as determined using a Fourier transform). Also, the output 700 indicates an amplitude for each peak. Some or all of the GC output 700 parameters shown in FIG. 7 may be used for comparing test chemical signatures with authorized user templates in the database. In the example shown, the output 700 indicates that four substances, labeled "A"-"D" in FIG. 7, have been detected, each with its own respective peak amplitude representing a sensed concentration of that substance.

For example, when a template having "M" peaks is compared to a test chemical signature indicating "N" peaks, with both N and M being integers greater than one, in a simplified comparison algorithm a match (and, hence, successful authentication) may be returned only if M=N. In other embodiments, a match may be returned responsive "N" equaling "M"±C, wherein C is an integer greater than zero, and otherwise not returning a match.

In yet other embodiments, not just the number but the type of substances may be used in the comparing. Thus, responsive to the comparison indicating that the substances indicated in the GC test chemical signature output are equal to the substances indicated in the template, it may be determined to authenticate the user, but responsive to the comparison not indicating that the substances indicated in the GC output are equal to the substances indicated in the template, it may be determined not to authenticate the user. As is the case when the number of substances, and not the substances themselves, are being compared, when the identities of the substances themselves are being compared, a comparison indicating that at least "M"±C of the "N" substances indicated in the test chemical signature are the same identities as the substances indicated in the template, a match may be returned.

In addition, or in lieu of the number and substance type tests above, in some embodiments the amplitudes of the peaks may be compared. Thus, a match may be returned responsive to determining that each of the "N" amplitude peaks in the test chemical signature are equal, within a non-zero range if desired, to the amplitudes of the corresponding respective "M" peaks of the template. Note that the amplitudes of all test chemical signature peaks should match the amplitudes of respective corresponding peaks in the template, or in other embodiments, the amplitudes of the "N" peaks in the test chemical signature may have to match only "M"±D of the respective corresponding amplitudes in the template for "authenticated" to be returned.

One, two, or all three of the tests (number of peaks, type of substance, and amplitude) may be used. When multiple tests are used, a single match in one of them may be sufficient to return "authenticated", even if no match is obtained from the other test(s). Or, all tests should produce match; otherwise, "not authenticated" may be returned. Yet again, when three tests are used, "authenticated" may be returned if only two of three tests produce a match.

Responsive to a match being found at diamond 308, the logic moves to block 310 to return a signal representing that the user is authenticated, equivalently, remains authenticated. Authentication enables normal computer operation for the user given the user's other security credentials and levels of access.

On the other hand, responsive to a match not being found at diamond 308, the logic moves to block 312 to return a signal representing that the user is not authenticated, equivalently, that authentication has failed. Failure of authentication limits computer operation and may lock the user out entirely from proceeding further to operate the computer. If desired, the logic may then move to block 314 to prompt the user to re-enter the secret code, assuming the user can access it or has access to it and re-enter the code to unlock the template generation steps at block 302. An example user interface (UI) to this end is described further below.

Figure 4:
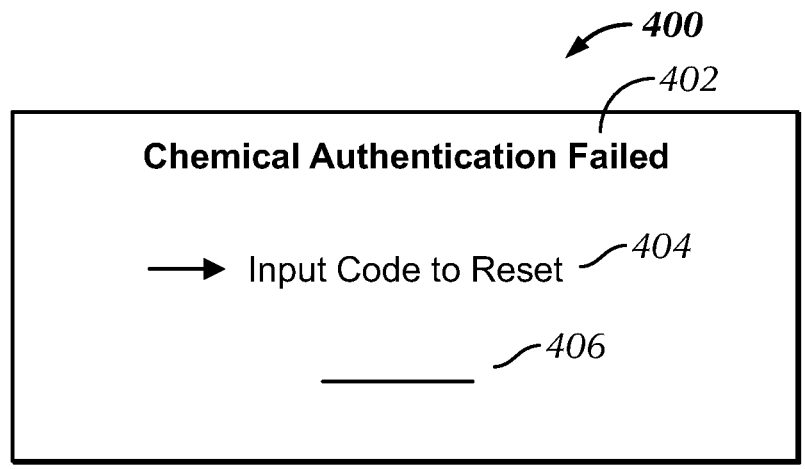
FIG. 4 is an example user interface (UI) that may be generated upon failure of authentication.

FIG. 4 shows an example UI 400 that may be presented on any of the displays herein responsive to the logic at block 314 of FIG. 3. A message 402 may be presented indicating that chemical signature authentication has failed. A prompt 404 may be presented to enter the secret code into a field 406 to permit re-entry into the template generation phase at block 302 of FIG. 3.

Additionally, in some embodiments a UI may be presented on a display of a device undertaking present principles for configuring settings of the device. For example, such a UI may include an option that is selectable to enable gas chromatography authentication and/or detection as disclosed herein.

In addition to the person's natural odor, a GC could also be used to identify the health and beauty products giving rise to peaks in a template and corresponding test chemical signature, which in combination help to further enhance the strength of the authentication. Identification of such products may also be used to present advertisements corresponding to those products.

Figure 5:
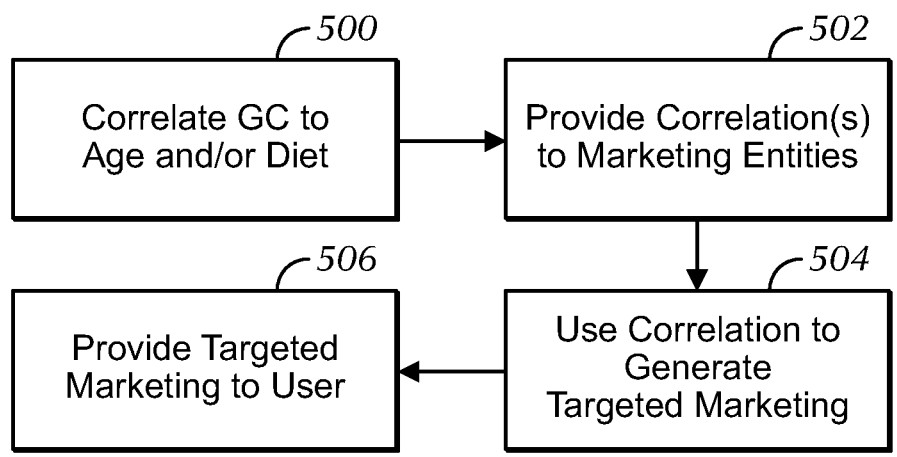
FIG. 5 is a flow chart of example alternate use of the GC discussed in FIGS. 3 and 4 for targeted advertising purposes.

As an alternate embodiment, in addition to or in lieu of use for authentication, the same GC output may be used to help assist marketing by using the data to indicate age and by detecting dietary preferences. FIG. 5 illustrates.

At block 500, a received output of a gas chromatograph representing a chemical signature of a person is correlated to a personal characteristic of the person generating the chemical signature represented by the output. The correlation may be based on empirical information derived from experimentation. For example, a large number of people of varying ages may be analyzed by GC and chemicals that are more prevalent in a certain age group may be noted and correlated to that age group. The same technique may be used for determining the sex of a person. For example, if estrogen is sensed the person may be correlated to "woman" whereas if testosterone is sensed the person may be correlated to "man".

Moving to block 502, the correlation at block 500 can be provided to marketing entities. At block 504 the marketing entities or the analyzing computer itself may generate marketing targeted at the personal characteristic (e.g., age, sex) found at block 500. The targeted marketing such as advertising may be presented to the user at block 506 via the computer that executed the correlation at block 500 or another computer or appliance of the user.

Figure 6:
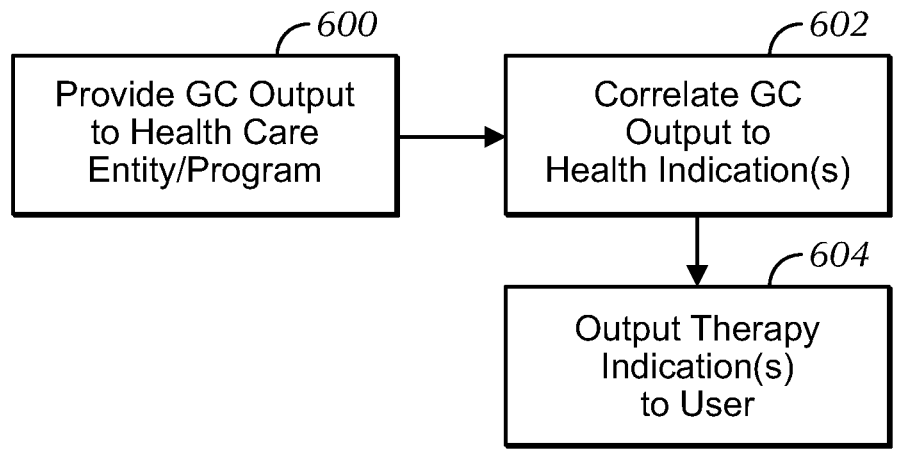
FIG. 6 is a flow chart of example alternate use of the GC discussed in FIGS. 3 and 4 for health monitoring purposes.

Present principles also understand that in addition to or in lieu of authentication and marketing purposes described above, the chemical signature of a person as indicated in GC data can also be useful in determining overall health, which can assist in marketing certain drugs to help alleviate certain chemicals that are known to cause specific maladies. FIG. 6 illustrates.

Commencing at block 600, a received one output of a GC representing a chemical signature of a person is provided to a health care entity and/or to a health care analysis algorithm. At block 602 the output is correlated to one or more health indicators. As but one example, it is known that Carbon-13 in the chemical signature of a person who has consumed a urea test pill corresponds to an infection in the stomach of *H. pylori*, which is believed to be the precursor to ulcers. Other chemical signatures corresponding to other indications of maladies or good health may be empirically determined similar to *H. pylori*. Hydrogen breath tests for lactose intolerance, Hydrogen breath tests for fructose intolerance, and breath tests to detect bacterial overgrowth in the small intestine are but three additional types of chemical signature information that may be provided to caregivers.

At block 604 a therapy may be output based on the correlation at block 602. In the non-limiting example of *H. pylori*, the therapy may be "consume Pepto-Bismol", the Bismuth in which is believed to counteract the bacteria. The output may be electronically transmitted to a medical caregiver from whom is received the therapy indication.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   a gas chromatograph (GC) accessible to the processor; and
   storage accessible to the processor and bearing instructions executable by the processor to:
   receive at least one output of the gas chromatograph;
   compare the at least one output to at least one template; and
   responsive to the comparison, perform an action comprising one or more of: authenticating a user, targeting at least one advertisement to the user, and presenting at least one indication for at least one therapy for the user;
   wherein the determination comprises whether to authenticate the user, wherein the at least one output indicates "N" substances, wherein "N" is an integer greater than one, and wherein the at least one template indicates "M" substances, wherein "M" is an integer greater than one, and wherein the instructions are executable to:
   responsive to the comparison indicating that "N" equals "M" plus/minus C, wherein C is an integer greater than zero, authenticate the user; and
   responsive to the comparison not indicating that "N" equals "M" plus/minus C, not authenticate the user.

2. The device of claim 1, wherein the instructions are executable to:
   responsive to the comparison indicating that "N" equals "M", authenticate the user; and
   responsive to the comparison not indicating that "N" equals "M", not authenticate the user.

3. The device of claim 1, wherein the instructions are executable to:
   responsive to the comparison indicating that the substances indicated in the at least one output are equal to the substances indicated in the template, authenticate the user; and
   responsive to the comparison not indicating that the substances indicated in the at least one output are equal to the substances indicated in the template, not authenticate the user.

4. The device of claim 1, wherein the instructions are executable by the processor to:
   responsive to the comparison indicating that at least "N"±C of the substances indicated in the at least one output are equal to the substances indicated in the template, authenticate the user; and
   responsive to the comparison not indicating that at least "N"±C of the substances indicated in the at least one output are equal to the substances indicated in the template, not authenticate the user.

5. The device of claim 1, wherein the at least one output comprises "N" amplitude peaks representing respective substances, wherein "N" is an integer greater than one, and wherein the at least one template indicates "M" amplitude peaks representing respective substances, wherein "M" is an integer greater than one, and wherein the instructions are executable to:
   responsive to the comparison indicating that all "N" amplitude peaks are equal, in amplitude within a range, to corresponding "M" amplitude peaks, authenticate the user; and
   responsive to the comparison not indicating that all "N" amplitude peaks are equal, in amplitude within a range, to corresponding "M" amplitude peaks, not authenticate the user.

6. The device of claim 2, wherein the at least one output comprises "N" amplitude peaks representing respective substances, wherein "N" is an integer greater than one, and wherein the at least one template indicates "M" amplitude peaks representing respective substances, wherein "M" is an integer greater than one, and wherein the instructions are executable to:
   responsive to the comparison indicating that all "N" amplitude peaks are equal, in amplitude within a range, to corresponding "M" amplitude peaks, authenticate the user; and
   responsive to the comparison not indicating that all "N" amplitude peaks are equal, in amplitude within a range, to corresponding "M" amplitude peaks, not authenticate the user.

7. The device of claim 1, wherein the at least one output comprises "N" amplitude peaks representing respective substances, wherein "N" is an integer greater than one, and wherein the at least one template indicates "M" amplitude peaks representing respective substances, wherein "M" is an integer greater than one, and wherein the instructions are executable to:

responsive to the comparison indicating that at least "M"±D of the "N" amplitude peaks are equal, in amplitude within a range, to corresponding "M"±D amplitude peaks, authenticate the user, wherein D is an integer greater than zero; and responsive to the comparison not indicating that at least "M"±D of the "N" amplitude peaks are equal, in amplitude within a range, to corresponding "M"±D amplitude peaks, not authenticate the user.

8. The device of claim 1, wherein the instructions are executable by the at least one processor to:

determine at least one indication for at least one therapy for the user, the determination of the indication being based at least in part on correlating the at least one output to Carbon-13;

based at least in part on correlating the at least one output to Carbon-13, present an indication to treat h-pylori in the user.

9. A method, comprising:

receiving, at a device, at least one output from a gas chromatograph (GC);

comparing the at least one output to at least one template; and responsive to the comparison, performing an action comprising one or more of: authenticating a user, targeting at least one advertisement to the user, and presenting at least one indication for at least one therapy for the user;

wherein the method comprises:

responsive to the comparison indicating that at least "M" plus/minus C of the substances indicated in the at least one output are equal to the substances indicated in the template, authenticating the user; and responsive to the comparison not indicating that at least "M" plus/minus C of the substances indicated in the at least one output are equal to the substances indicated in the template, not authenticating the user.

10. The method of claim 9, wherein the at least one output indicates at least "X" substances, wherein "X" is an integer greater than one, and wherein the at least one template indicates "Y" substances, wherein "Y" is an integer greater than one, and wherein the method comprises:

responsive to the comparison indicating that "X" equals "Y", determining to authenticate the user; and responsive to the comparison not indicating that "X" equals "Y", determining not to authenticate the user.

11. The method of claim 9, wherein the at least one output indicates "X" substances, wherein "X" is an integer greater than one, and wherein the at least one template indicates "Y" substances, wherein "Y" is an integer greater than one, and wherein the method comprises:

responsive to the comparison indicating that "X" equals "Y"±C, wherein C is an integer greater than zero, determining to authenticate the user; and responsive to the comparison not indicating that "X" equals "Y"±C, determining not to authenticate the user.

12. The method of claim 9, wherein the method comprises:

responsive to the comparison indicating that the substances indicated in the at least one output are equal to the substances indicated in the template, authenticating the user; and responsive to the comparison not indicating that the substances indicated in the at least one output are equal to the substances indicated in the template, not authenticating the user.

13. The method of claim 9, wherein the determination comprises whether to authenticate the user, wherein the at least one output comprises "M" amplitude peaks representing respective substances, wherein "M" is an integer greater than one, and wherein the at least one template indicates "N" amplitude peaks representing respective substances, wherein "N" is an integer greater than one, and wherein the method comprises:

responsive to the comparison indicating that all "M" amplitude peaks are equal, in amplitude within a range, to corresponding "N" amplitude peaks, determining to authenticate the user; and responsive to the comparison not indicating that all "M" amplitude peaks are equal, in amplitude within a range, to corresponding "N" amplitude peaks, determining not to authenticate the user.

14. The method of claim 10, wherein the at least one output comprises "M" amplitude peaks representing respective substances, wherein "M" is an integer greater than one, and wherein the at least one template indicates "N" amplitude peaks representing respective substances, wherein "N" is an integer greater than one, and wherein the method comprises:

responsive to the comparison indicating that all "M" amplitude peaks are equal, in amplitude within a range, to corresponding "N" amplitude peaks, determining to authenticate the user; and responsive to the comparison not indicating that all "M" amplitude peaks are equal, in amplitude within a range, to corresponding "N" amplitude peaks, determining not to authenticate the user.

15. The method of claim 11, wherein the at least one output comprises "M" amplitude peaks representing respective substances, wherein "M" is an integer greater than one, and wherein the at least one template indicates "N" amplitude peaks representing respective substances, wherein "N" is an integer greater than one, and wherein the method comprises:

responsive to the comparison indicating that at least "N"±D of the "M" amplitude peaks are equal, in amplitude within a range, to corresponding "N"±D amplitude peaks, determining to authenticate the user, wherein D is an integer greater than zero; and responsive to the comparison not indicating that at least "N"±D of the "M" amplitude peaks are equal, in amplitude within a range, to corresponding "N"±D amplitude peaks, determining not to authenticate the user.

16. The method of claim 9, wherein the method comprises:

determining at least one indication for at least one therapy for the user, the determination of the indication being based at least in part on correlating the at least one output to Carbon-13;

based at least in part on correlating the at least one output to Carbon-13, presenting an indication to treat h-pylori in the user.

17. A computer readable storage medium (CRSM) that is not a transitory signal, the computer readable storage medium comprising instructions executable by at least one processor to:

receive at least one output from a gas chromatograph (GC);

compare the at least one output to at least one template; and responsive to the comparison, perform an action comprising one or more of: authenticate a user, target at least one advertisement to the user, and present at least one indication for at least one therapy for the user;

wherein the at least one output comprises "N" amplitude peaks representing respective substances, wherein "N" is an integer greater than one, and wherein the at least one template indicates "M" amplitude peaks representing respective substances, wherein "M" is an integer greater than one, and wherein the instructions are executable to:

responsive to the comparison indicating that at least "M" plus/minus D of the "N" amplitude peaks are equal, in amplitude within a range, to corresponding "M" plus/minus D amplitude peaks, authenticate the user, wherein D is an integer greater than zero; and responsive to the comparison not indicating that at least "M" plus/minus D of the "N" amplitude peaks are equal, in amplitude within a range, to corresponding "M" plus/minus D amplitude peaks, decline to authenticate the user.

18. The CRSM of claim 17, wherein the at least one output indicates "X" substances, wherein "X" is an integer greater than one, and wherein the at least one template indicates "Y" substances, wherein "Y" is an integer greater than one, and wherein the instructions are executable to:

responsive to the comparison indicating that "X" equals "Y"±C, wherein C is an integer greater than zero, determine to authenticate the user; and responsive to the comparison not indicating that "X" equals "Y"±C, determine not to authenticate the user.

19. The CRSM of claim 17, wherein the instructions are executable by the at least one processor to:

determine at least one indication for at least one therapy for the user, the determination of the indication being based at least in part on correlating the at least one output to Carbon-13;

based at least in part on correlating the at least one output to Carbon-13, present an indication to treat h-pylori in the user.

20. The CRSM of claim 17, wherein the instructions are executable by the at least one processor to:

correlate a chemical signature of the user as indicated by the substances to a particular age group for the user and/or to a particular sex of the user; and based on the correlation, target at least one advertisement to the user.

\* \* \* \* \*